US008487886B2

(12) United States Patent
Tsuzaki et al.

(10) Patent No.: US 8,487,886 B2
(45) Date of Patent: Jul. 16, 2013

(54) INFORMATION INPUT DEVICE, INFORMATION INPUT METHOD, INFORMATION INPUT/OUTPUT DEVICE, AND INFORMATION INPUT PROGRAM

(75) Inventors: Ryoichi Tsuzaki, Kanagawa (JP); Nobuki Furue, Tokyo (JP); Mitsuo Okumura, Tokyo (JP); Shingo Kurokawa, Tokyo (JP); Kazunori Yamaguchi, Kanagawa (JP); Tsutomu Harada, Kanagawa (JP); Mitsuru Tateuchi, Kanagawa (JP)

(73) Assignee: Japan Display West Inc., Chita (JP)

( * ) Notice: Subject to any disclaimer, the term of this patent is extended or adjusted under 35 U.S.C. 154(b) by 745 days.

(21) Appl. No.: 12/549,513

(22) Filed: Aug. 28, 2009

(65) Prior Publication Data
US 2010/0053107 A1 Mar. 4, 2010

(30) Foreign Application Priority Data
Sep. 2, 2008 (JP) .................... 2008-225122

(51) Int. Cl.
*G06F 3/041* (2006.01)
(52) U.S. Cl.
USPC ............................ 345/173; 345/502; 345/156
(58) Field of Classification Search
None
See application file for complete search history.

(56) References Cited

U.S. PATENT DOCUMENTS

| | | | | |
|---|---|---|---|---|
| 7,612,744 | B2 * | 11/2009 | Tateuchi | 345/76 |
| 2006/0103637 | A1 * | 5/2006 | Yamaguchi et al. | 345/175 |
| 2006/0170660 | A1 | 8/2006 | Miyata et al. | |
| 2008/0094367 | A1 | 4/2008 | Van De Ven et al. | |
| 2008/0105470 | A1 | 5/2008 | Van De Ven et al. | |
| 2008/0136754 | A1 | 6/2008 | Tsuzaki et al. | |
| 2008/0174570 | A1 | 7/2008 | Jobs et al. | |

FOREIGN PATENT DOCUMENTS

| | | |
|---|---|---|
| JP | 10-049305 | 2/1998 |
| JP | 2002-287660 | 10/2002 |
| JP | 2003-271294 | 9/2003 |
| JP | 2004-070492 | 3/2004 |
| JP | 2005-018669 | 1/2005 |
| JP | 2005-352632 | 12/2005 |
| JP | 2006-209684 | 8/2006 |
| JP | 2006-345209 | 12/2006 |
| JP | 2007-128497 | 5/2007 |
| JP | 2008-146165 | 6/2008 |

* cited by examiner

*Primary Examiner* — Muhammad N Edun
(74) *Attorney, Agent, or Firm* — Robert J. Depke; The Chicago Technology Law Group, LLC

(57) ABSTRACT

An information input device is provided, which may perform highly-convenient processing in response to input of information with an external proximity object. The information input device includes: an input panel having a detection function of detecting an external proximity object, to be used in a state of being placed on a display panel; a position detection section detecting position and area value of the external proximity object based on a detection signal of the external proximity object obtained by the input panel; and an image generation section generating display data to be utilized to display an image including a display object, in such a manner that size of the display object displayed on the display panel at the detected position of the external proximity object is allowed to vary in accordance with the detected area value of the external proximity object.

15 Claims, 11 Drawing Sheets

1

INFORMATION INPUT DEVICE, INFORMATION INPUT METHOD, INFORMATION INPUT/OUTPUT DEVICE, AND INFORMATION INPUT PROGRAM

The present application claims priority to Japanese Patent Application JP 2008-225122 filed in the Japan Patent Office on Sep. 2, 2008, the entire contents of which are hereby incorporated by reference.

BACKGROUND OF THE INVENTION

1. Field of the Invention

The present invention relates to an information input device, an information input method, an information input program and an information input/output device for performing processing in response to input of information on an external proximity object.

2. Background Art

An image display device sometimes has a touch panel. The touch panel includes a resistive touch panel using change in electric resistance, a capacitive touch panel using change in capacitance, and an optical touch panel optically detecting a finger or the like.

The optical touch panel, for example, modulates light from a backlight by using a liquid crystal element and displays an image on a display screen, and receives light, the light being emitted from the display screen and then reflected by an approaching object such as a finger, by using light-receiving elements arranged on the display screen, and thereby detects a position or the like of the approaching object. A document describing such an image display device includes Japanese Unexamined Patent Application, Publication No. 2008-146165. A display device described in the document has a display unit for displaying an image, and an image pickup unit for taking an image of an object.

SUMMARY OF THE INVENTION

In such a touch panel, such instinctive operation is desired to be achieved to improve convenience of a user, including operation where a display state is changed in accordance with motion of an external proximity object (for example, a user finger). Specifically, for example, it is sometimes desired that a portion specified by a user finger or the like is displayed while being changed in size in accordance with contact area of the finger.

However, a touch panel has not been achieved in the past, which enables such instinctive size-change operation in accordance with contact area (detection area) of the external proximity object. Therefore, an information input device enabling such instinctive operation has been desired to be achieved.

In view of foregoing, it is desirable to provide an information input device, an information input method, an information input/output device, and an information input program, which may perform highly-convenient processing in response to input of information on an external proximity object.

An information input device of an embodiment of the invention includes: an input panel having a detection function of detecting an external proximity object, to be used in a state of being placed on a display panel; a position detection section detecting position and area value of the external proximity object based on a detection signal of the external proximity object obtained by the input panel; and an image generation section generating display data to be utilized to display an image including a display object, in such a manner that size of the display object displayed on the display panel at the detected position of the external proximity object is allowed to vary in accordance with the detected area value of the external proximity object.

An information input method of an embodiment of the invention includes steps of: detecting position and area value of an external proximity object based on a detection signal of the external proximity object obtained by an input panel placed on a display panel; and generating display data to be utilized to display an image including a display object, in such a manner that size of the display object displayed on the display panel at the detected position of the external proximity object is allowed to vary in accordance with the detected area value of the external proximity object.

An information input/output device of an embodiment of the invention includes: an input/output panel having a detection function of detecting an external proximity object and an image display function; a position detection section detecting position and area value of the external proximity object based on a detection signal of the external proximity object obtained by the input/output panel; and an image generation section generating display data to be utilized to display an image including a display object, in such a manner that size of the display object displayed on the input/output panel at the detected position of the external proximity object is allowed to vary in accordance with the detected area value of the external proximity object. The image including the display object is displayed on the input/output panel based on the display data.

In an information input program of an embodiment of the invention, the information input program allows a computer to execute steps of: detecting position and area value of an external proximity object based on a detection signal of the external proximity object obtained by an input panel placed on a display panel; and generating display data utilized to display an image including a display object in such a manner that size of the display object displayed on the display panel at the detected position of the external proximity object is allowed to vary in accordance with the detected area value of the external proximity object.

In the information input device, the information input method, the information input/output device, and the information input program according to the embodiment of the invention, position and area value of an external proximity object are detected based on a detection signal of the external proximity object obtained by an input panel or an input/output panel placed on a display panel. In addition, display data utilized to display an image including a display object, is generated in such a manner that size of the display object displayed on the display panel at the detected position of the external proximity object is allowed to vary in accordance with the detected area value of the external proximity object.

In the information input device, the information input method, the information input/output device, or the information input program according to the embodiment of the invention, position and area value of an external proximity object are detected based on a detection signal of the external proximity object obtained by an input panel or an input/output panel placed on a display panel, and display data utilized to display an image including a display object, is generated in such a manner that size of the display object displayed on the display panel at the detected position of the external proximity object is allowed to vary in accordance with the detected area value of the external proximity object. Therefore, highly-convenient processing may be performed in response to input of information on an external proximity object.

DETAILED DESCRIPTION OF EMBODIMENT

Hereinafter, a preferred embodiment of the invention will be described in detail with reference to drawings.

Figure 1:
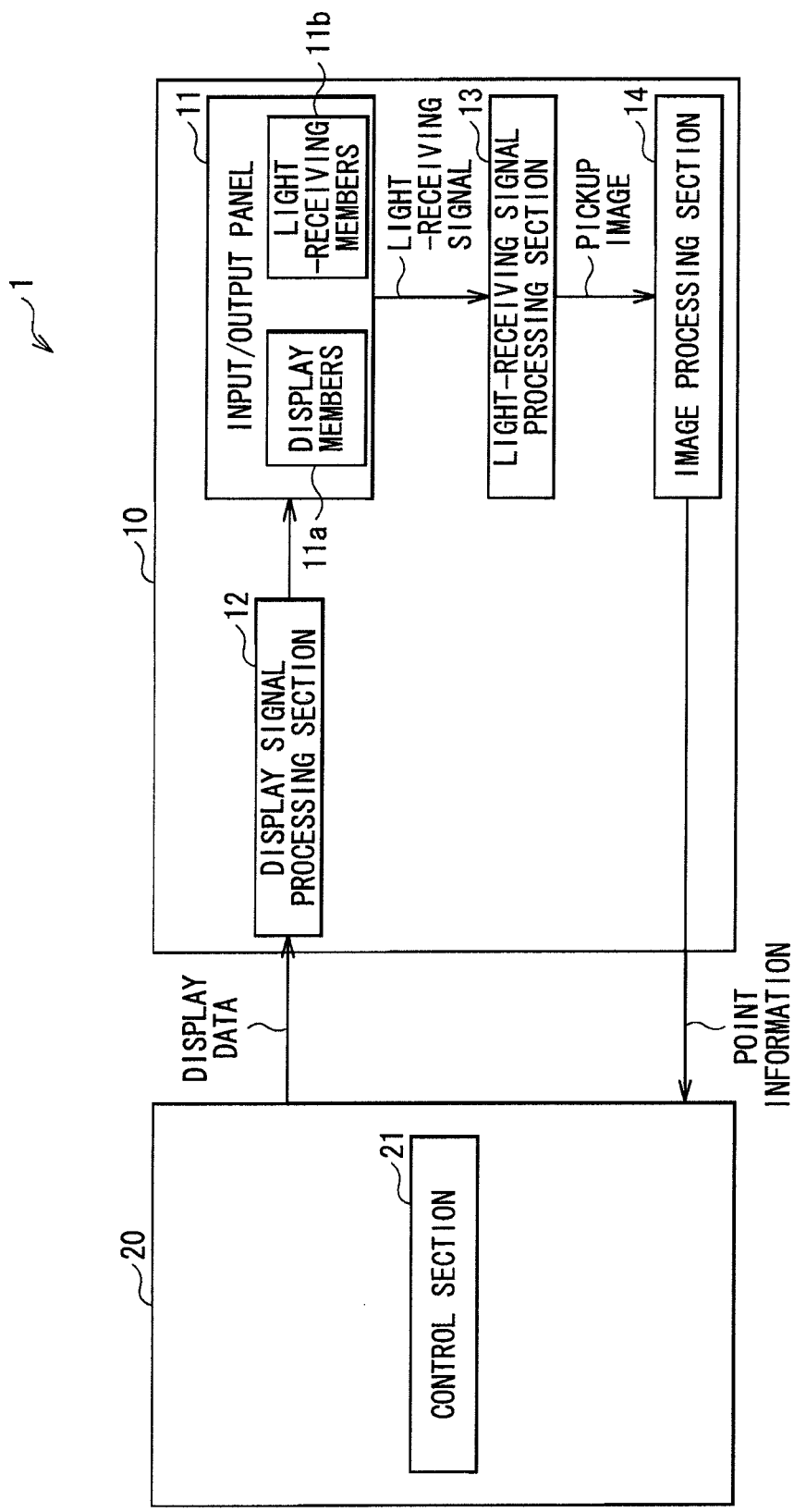
FIG. 1 is a block diagram showing a configuration of an information input/output device according to an embodiment of the invention.
Figure 2:
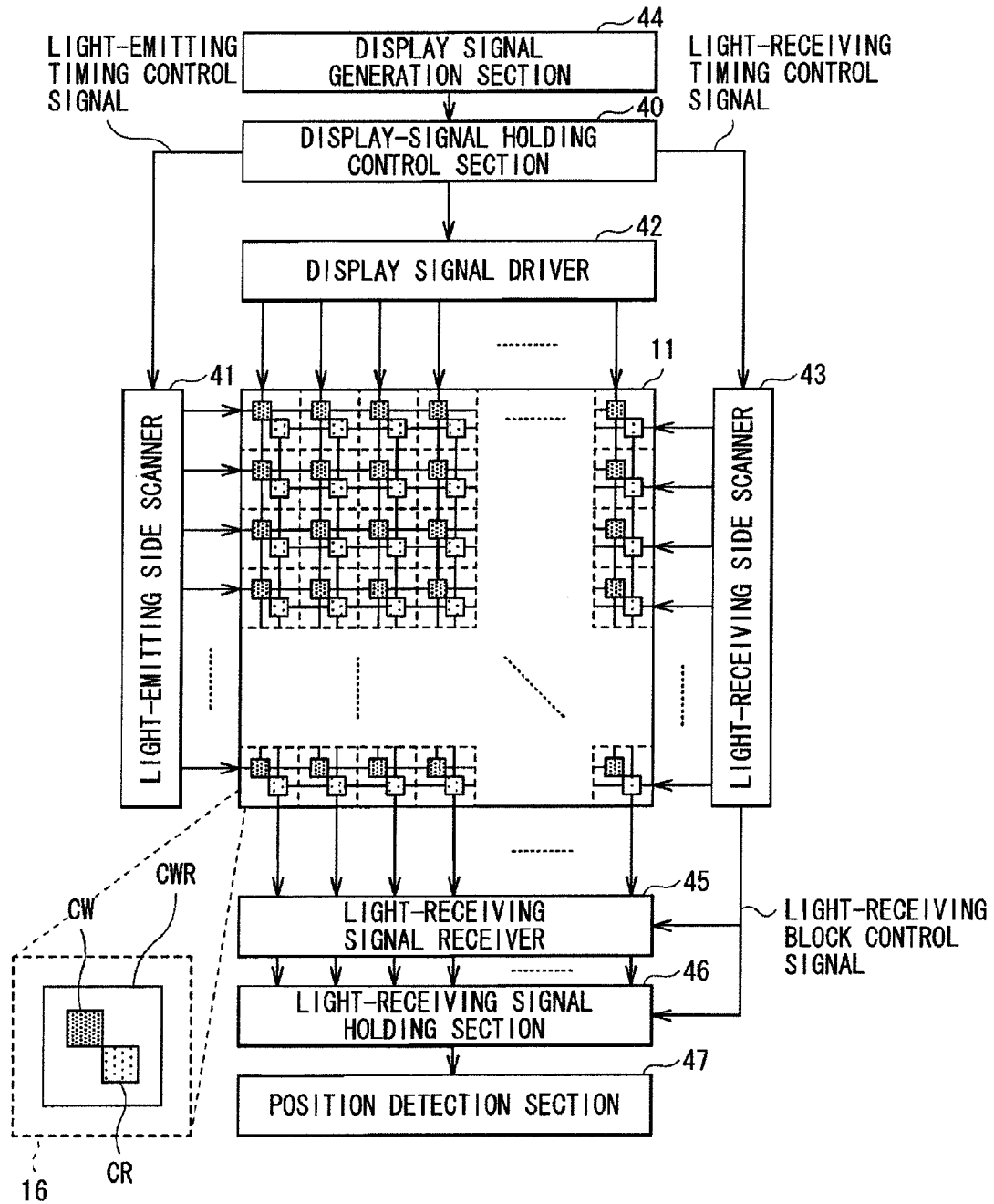
FIG. 2 is a block diagram showing a configuration of the information input/output device of FIG. 1 in a more detailed manner.
Figure 3:
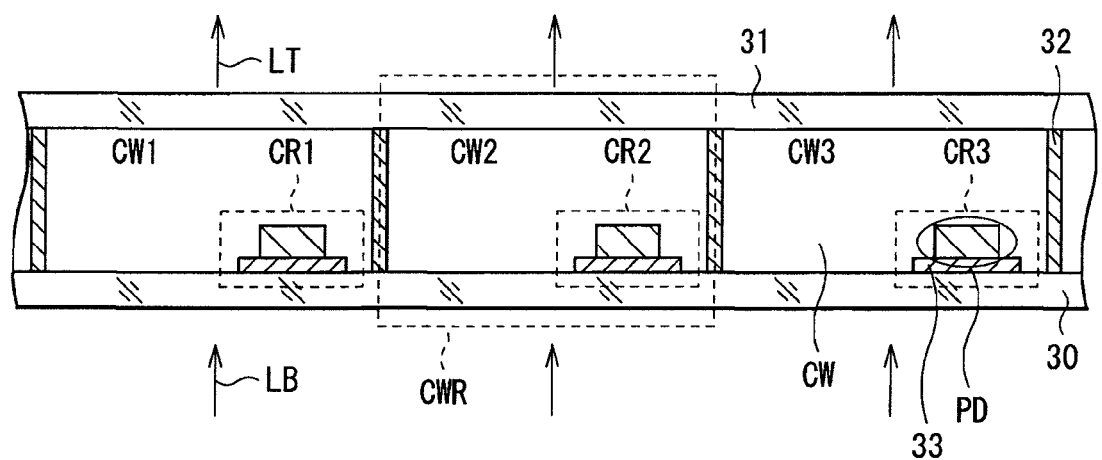
FIG. 3 is a section diagram of part of an input/output panel in an enlarged manner.

FIG. 1 shows a schematic configuration of an information input/output device 1 according to an embodiment of the invention. FIG. 2 shows a detailed configuration of the information input/output device 1 according to the embodiment. FIG. 3 shows a section of part of an input/output panel in an enlarged manner. The information input/output device 1 according to the embodiment has a display 10, and an electronic device body 20 using the display 10 as shown in FIG. 1. The display 10 has an input/output panel 11, a display signal processing section 12, a light-receiving signal processing section 13 and an image processing section 14. The electronic device body 20 has a control section 21. Since an information-input method and an information-input program according to an embodiment of the invention are embodied in the information input/output device 1 of the embodiment, they are collectively described below.

As shown in FIG. 2, the input/output panel 11 is configured of a liquid crystal display panel in which a plurality of pixels 16 are arranged in a matrix form, and includes display members 11a and light-receiving members 11b. Each of the display members 11a is a liquid crystal element displaying an image of graphics, letters or the like on a display screen by using light emitted from a backlight being a light source. Each of the light-receiving members 11b is a light-receiving element such as photodiode, which receives light and outputs a corresponding electric signal. The light-receiving member 11b receives light being emitted from the backlight, and then reflected by an external proximity object such as a finger outside the input/output panel 11, and then returned, and outputs a light-receiving signal (detection signal). In the case of the embodiment, the light-receiving members 11b are disposed for each pixel 16, and plurally arranged in a plane.

As shown in FIGS. 2 and 3, the input/output panel 11 is configured in such a manner that a plurality of light-emitting/light-receiving cells CWR, which are structured to be separated from one another by partitions 32, are arranged in a matrix form between a pair of transparent substrates 30 and 31. The respective light-emitting/light-receiving cells CWR have light-emitting cells CW (CW1, CW2, CW3, . . . ), and a plurality of light-receiving cells (CR1, CR2, CR3, . . . ) encapsulated in the respective light-emitting cells CW. Each light-emitting cell CW includes a liquid crystal cell as a display member 11a, and each light-receiving cell includes a light-receiving element PD as a light-receiving member 11b. The light-receiving cell CR has a shielding layer 33 disposed between the transparent substrate 30 on a backlight side and the light-receiving element PD so as to prevent incidence of light LB emitted from the backlight, and thus each light-receiving element PD detects only light injected in a direction from the transparent substrate 31 on a side opposite to the backlight side without being affected by the light LB from the backlight.

The display signal processing section 12 shown in FIG. 1 is a circuit that is connected to the input/output panel 11 as a previous stage of the panel 11, and drives the input/output panel 11 to display an image based on display data.

The display signal processing section 12, as shown in FIG. 2, has a display-signal holding control section 40, a light-emitting-side scanner 41, a display-signal driver 42, and a light-receiving-side scanner 43. The display-signal holding control section 40 has a function of storing a display signal outputted from a display signal generation section 44 into a field memory configured of, for example, SRAM (Static Random Access Memory) and holding the signal therein for each image screen (for each field display), and has a function of controlling the light-emitting-side scanner 41 and the display-signal driver 42 for driving each light-emitting cell CW, and the light-receiving-side scanner 43 for driving each light-receiving cell CR to be operated in an interlocking manner. Specifically, the control section 40 outputs a light-emitting timing control signal to the light-emitting-side scanner 41, a light-receiving timing control signal to the light-receiving-side scanner 43, and a display signal for one horizontal line to the display-signal driver 42 based on a control signal and display signals held in the field memory. According to the control signals and the display signal, line sequential operation is performed.

The light-emitting-side scanner 41 has a function of selecting a light-emitting cell CW as a driving object in response to the light-emitting timing control signal outputted from the display-signal holding control section 40. Specifically, the scanner 41 supplies a light-emitting selection signal via a light-emitting gate line connected to each pixel 16 in the input/output panel 11 so that a light-emitting element selection switch is controlled. That is, when a voltage, by which a light-emitting element selection switch of a particular pixel 16 is turned on, is applied to the switch by the light-emitting selection signal, the pixel 16 performs light-emitting operation with luminance corresponding to a voltage supplied from the display-signal driver 42.

The display-signal driver 42 has a function of supplying display data to a light-emitting cell CW as a driving object in response to the display signal for one horizontal line outputted from the display-signal holding control section 40. Specifically, the driver 42 supplies a voltage corresponding to display data to a pixel 16 selected by the light-emitting-side scanner 41 via a data supply line connected to each pixel 16 in the input/output panel 11. The light-emitting-side scanner 41 and the display-signal driver 42 are interlocked so that line sequential operation is performed, thereby an image corresponding to an optional display data is displayed on the input/output panel 11.

The light-receiving-side scanner 43 has a function of selecting a light-receiving cell CR as a driving object in response to the light-receiving timing control signal outputted from the display-signal holding control section 40. Specifically, the scanner 43 supplies a light-receiving selection signal via a light-receiving gate line connected to each pixel 16 in the input/output panel 11 so that a light-receiving element selection switch is controlled. That is, in the same manner as operation of the light-emitting-side scanner 41, when a voltage, by which a light-receiving element selection switch of a particular pixel 16 is turned on, is applied to the switch by a light-receiving selection signal, a light-receiving signal detected from the pixel 16 is outputted to a light-receiving signal receiver 45. Thus, for example, the light-receiving cell CR may receive and detect light being emitted from a particular light-emitting cell CW, and reflected by a contacting or approaching object. In addition, the light-receiving-side scanner 43 has a function of outputting a light-receiving block control signal to the light-receiving signal receiver 45 and the light-receiving signal holding section 46, and thus controlling a block contributing to such light-receiving operation. In the information input/output device 1 of the embodiment, the light-emitting gate line and the light-receiving gate line are separately connected to each light-emitting/light-receiving cell CWR, so that the light-emitting-side scanner 41 and the light-receiving-side scanner 43 may be separately operated from each other.

The light-receiving signal processing section 13 shown in FIG. 1 is connected to the input/output panel 11 as a subsequent stage of the panel 11, and loads a light-receiving signal from the light-receiving element 11b to perform amplification or the like of the signal. The light-receiving signal processing section 13 has the light-receiving signal receiver 45 and the light-receiving signal holding section 46 as shown in FIG. 2.

The light-receiving signal receiver 45 has a function of acquiring a light-receiving signal for one horizontal line outputted from each light-receiving cell CR in response to the light-receiving block control signal outputted from the light-receiving-side scanner 43. The light-receiving signal for one horizontal line acquired by the light-receiving signal receiver 45 is outputted to the light-receiving signal holding section 46.

The light-receiving signal holding section 46 has a function of reconfiguring a light-receiving signal outputted from the light-receiving signal receiver 45 into a light-receiving signal for each image screen (for each field display) in response to the light-receiving block control signal outputted from the light-receiving-side scanner 43, and storing the light-receiving signal into a field memory configured of, for example, SRAM, and holding the signal therein. Data of the light-receiving signal stored by the light-receiving signal holding section 46 are outputted to a position detection section 47 in the image processing section 14 (FIG. 1). The light-receiving signal holding section 46 may be configured of a storage element other than a memory. For example, the light-receiving signal may be held in a capacitance element as analog data (electric charges).

The image processing section 14 (FIG. 1) is a circuit that is connected to the light-receiving signal processing section 13 as a subsequent stage of the section 13, and loads a pickup image from the section 13, and performs processing of the image, including binarization, noise removal, labeling and the like, so as to obtain point information of an external proximity object, namely, the center of gravity or a center coordinate of the object, and obtain information showing a region (size or shape) of the object. Specifically, a labeling section (not shown) in the image processing section 14 performs labeling, thereby acquires label information on a pickup image as a whole (information showing an identification number for each connected region in the pickup image), and position information and area information for each connected region.

A position detection section 47 (FIG. 2) in the image processing section 14 performs signal processing based on the label information, the position information and the area information obtained by the labeling section so as to specify a position where a detected object exists. Thus, a position of a contacting or approaching finger or the like may be specified.

The electronic device body 20 (FIG. 1) outputs display data to the display signal processing section 12 in the display 10, and is inputted with point information from the image processing section 14. The control section 21 uses the point information to change a display image.

The control section 21 (FIG. 1) uses the point information to change a display image, and is configured of, for example, CPU (Central Processing Unit) or the like. The control section 21 has a display signal generation section 44 as shown in FIG. 2. The display signal generation section 44 generates a display signal, for example, for displaying an image for each image screen (for each field display) based on image data generated and supplied by not-shown CPU (Central Processing Unit) or the like, and outputs the display signal to the image-signal holding control section 40.

Figure 4:
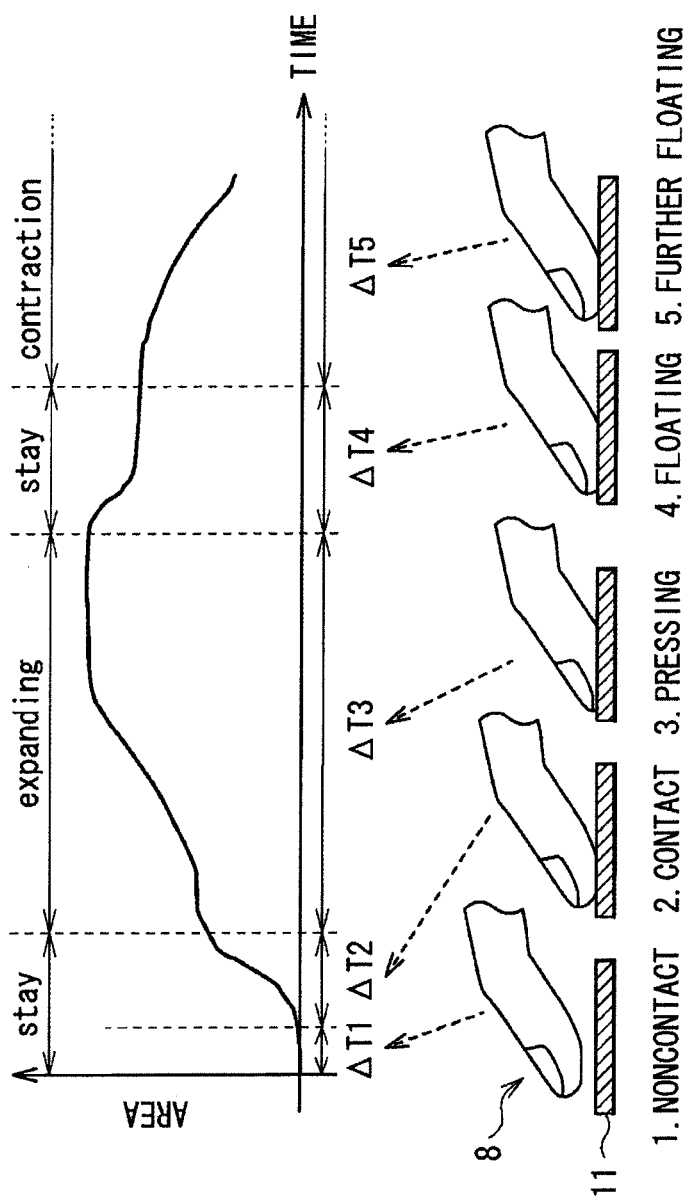
FIG. 4 is a schematic diagram showing, along time base, an example of a relationship between detection area and a display mode in the input/output panel.

Moreover, for example, when an external proximity object, a user finger 8 or the like, is contacted to the input/output panel 11 as shown in FIG. 4, the control section 21 generates display data based on area information of the detected finger 8 or the like. Specifically, the control section uses a phenomenon that when the finger 8 or the like is contacted to the input/output panel 11, detection area of the finger 8 or the like is changed depending on pressing force (contact pressure). The control section 21 generates the display data in such a manner that size of a display object specified by the finger 8 or the like is changed in accordance with an area value of the finger 8 or the like by using the position information and the area information of the finger 8 or the like obtained by the image processing section 14 (position detection section 47), and supplies the display data to the display signal processing section 12. The input/output panel 11 displays an image including the display object specified by the finger 8 or the like based on the display data generated in this way. The control section 21 corresponds to a specific example of the "image generation section" in the invention.

Specifically, the control section 21 holds a saturated area value (S value described later) being an area value when time variation of an area value of the finger 8 or the like is kept within a predetermined range, and generates display data in such a manner that size of a display object is changed in accordance with a change rate of an area value to the saturated area value. More specifically, when a change rate of an area value is larger than a predetermined upper threshold value (value of (S value*coefficient k1) described later), the control section generates display data in such a manner that the display object is expanded (expanding display mode; "expanding" in the figure). When the change rate of the area value is smaller than a predetermined lower threshold value (value of (S value*coefficient k2) described later), the control section generates display data in such a manner that the display object is contracted (contraction display mode; "contraction" in the figure). When the change rate of the area value is equal to or more than the lower threshold value and equal to or less than the upper threshold value, the control section generates display data in such a manner that size of the display object is kept (stay display mode; "stay" in the figure).

For example, in an example shown in FIG. 4, a display mode is the stay display mode "stay" in a period ΔT1 corresponding to "1 noncontact", a period ΔT2 corresponding to "2 contact", and a period ΔT4 corresponding to "4 floating". In addition, the display mode is the expanding display mode "expanding" in a period ΔT3 corresponding to "3 pressing". In addition, the display mode is the contraction display mode "contraction" in a period ΔT5 corresponding to "5 further floating". For example, when the display mode transitions from "expanding" in the period ΔT3 to "contraction" in the period ΔT5, the display mode may be sometimes allowed to directly transition from "expanding" to "contraction" without "stay" in the period ΔT4 in between unlike the example as shown in FIG. 4.

Next, effects and advantages of the information input/output device 1 of the embodiment are described with reference to FIGS. 1 to 4 and FIGS. 5 to 9.

Figure 5:
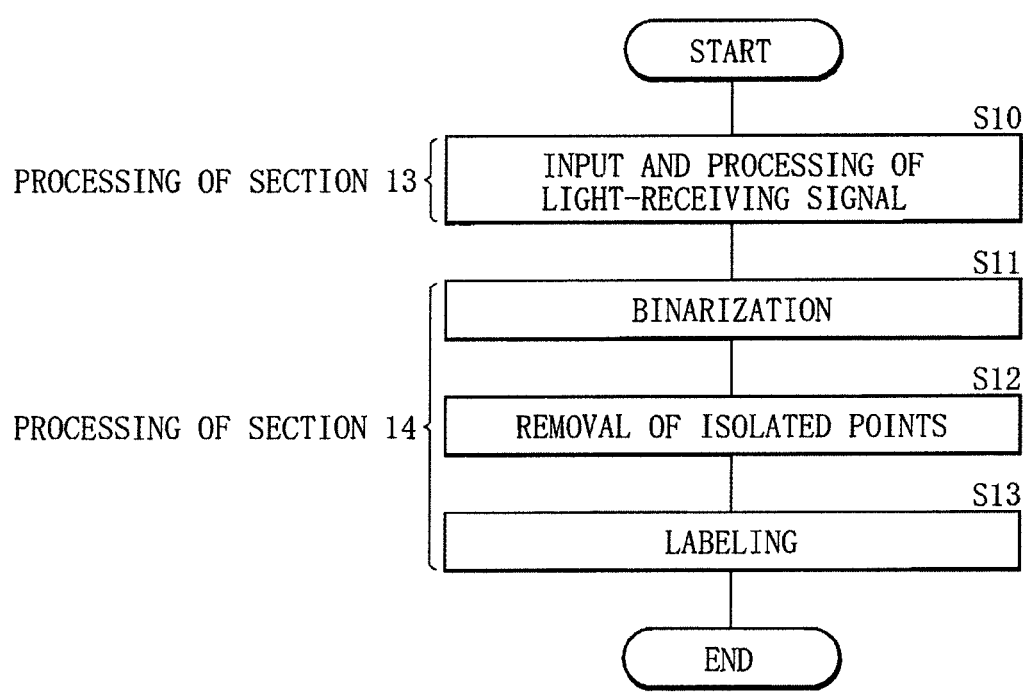
FIG. 5 is a flowchart of overall image processing by the information input/output device.

First, basic operation of the information input/output device 1 is described with reference to FIG. 5. FIG. 5 shows flow of overall image processing by the information input/output device 1.

Display data outputted from the electronic device body 20 are inputted into the display signal processing section 12. The display signal processing section 12 drives the input/output panel 11 in such a manner that an image is displayed on the panel 11 based on the display data.

The input/output panel 11 drives light-receiving members 11b while displaying an image on display members 11a by using light emitted from the backlight. When an external proximity object such as a finger is contacted to or approaches a display member 11a, an image displayed on the display member 11a is reflected by the external proximity object, and the reflected light is detected by a light-receiving member 11b. In response to such detection, the light-receiving member 11b outputs a light-receiving signal. The light-receiving signal processing section 13 is inputted with the light-receiving signal, and performs processing of the signal such as amplification (step S10 in FIG. 5). In this way, the light-receiving signal processing section 13 obtains a pickup image.

Next, the image processing section 14 is inputted with the pickup image from the light-receiving signal processing section 13, and performs binarization of the pickup image (step S11). That is, the image processing section 14 stores a beforehand set threshold value, and for example, performs binarization where whether signal intensity of pickup image data is lower than the threshold value or not is comparatively determined, so that the signal intensity is set to "0" or "1". Thus, a portion, where light reflected by the external proximity object is received, is set to "1", and other portions are set to "0".

Then, the image processing section 14 removes isolated points from the binarized pickup image (step S12). That is, in the case that the pickup image is binarized as above, the image processing section 14 removes each portion set to "1" as a portion isolated from the external proximity object, and thereby removes noise.

Then, the image processing section 14 performs labeling in the labeling section (not shown) (step S13). That is, in the case that the pickup image is binarized as above, the labeling section performs labeling of a portion set to "1". Then, the labeling section detects a region set to "1" as a region of the external proximity object, and acquires the label information, the position information, and the area information respectively. Such data are outputted to the control section 21 as point information.

Next, the control section 21 performs necessary processing such as change of a display image by using the point information inputted from the image processing section 14. For example, when a case that some operational menu is displayed on a screen is assumed, the section 21 detects which button is selected from the operational menu by a user finger, and executes a command corresponding to the selected button. This is the end of basic operation of the information input/output device 1.

Figure 6:
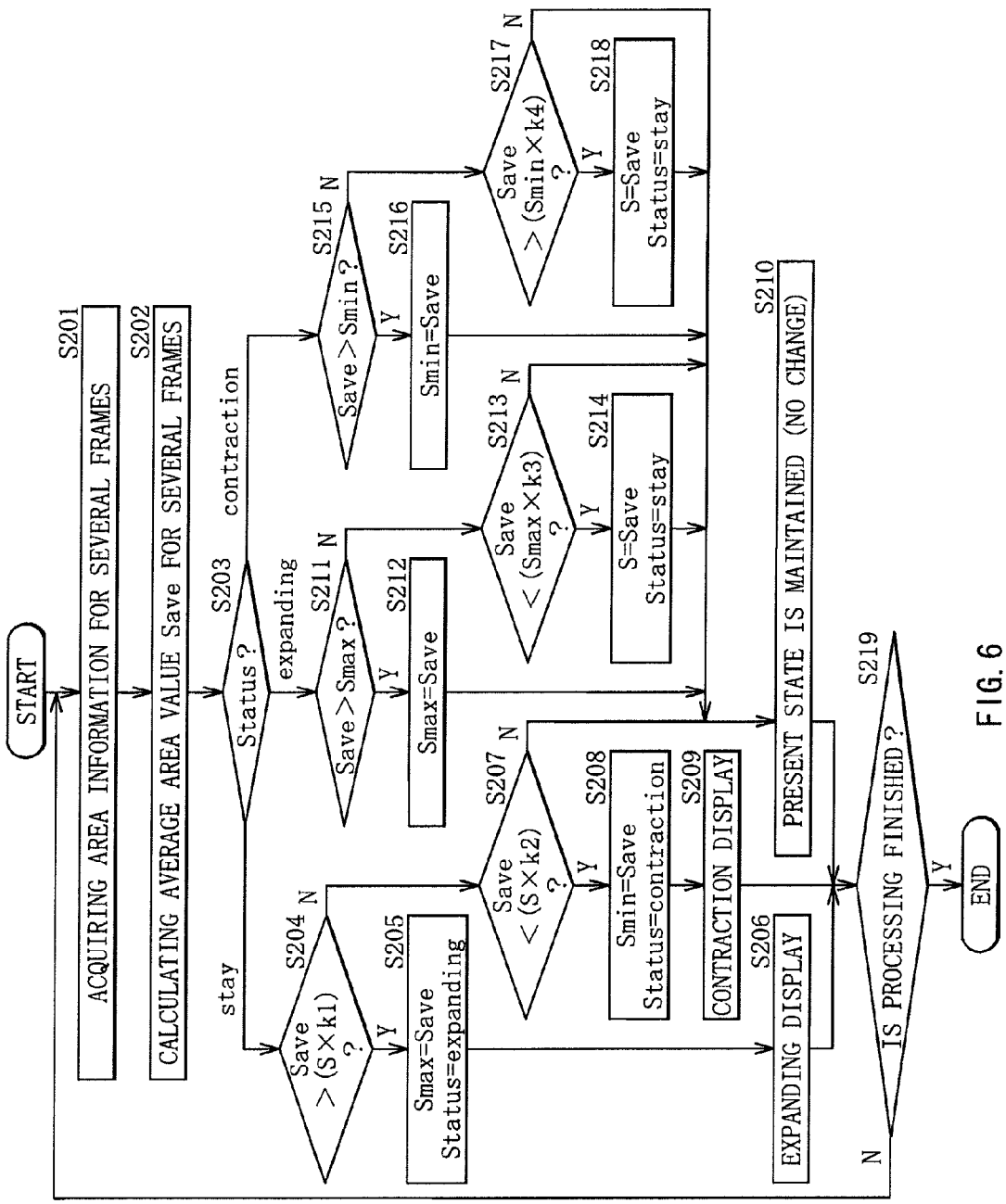
FIG. 6 is a flowchart showing a detail of display-data generation processing according to the embodiment.
Figure 7:
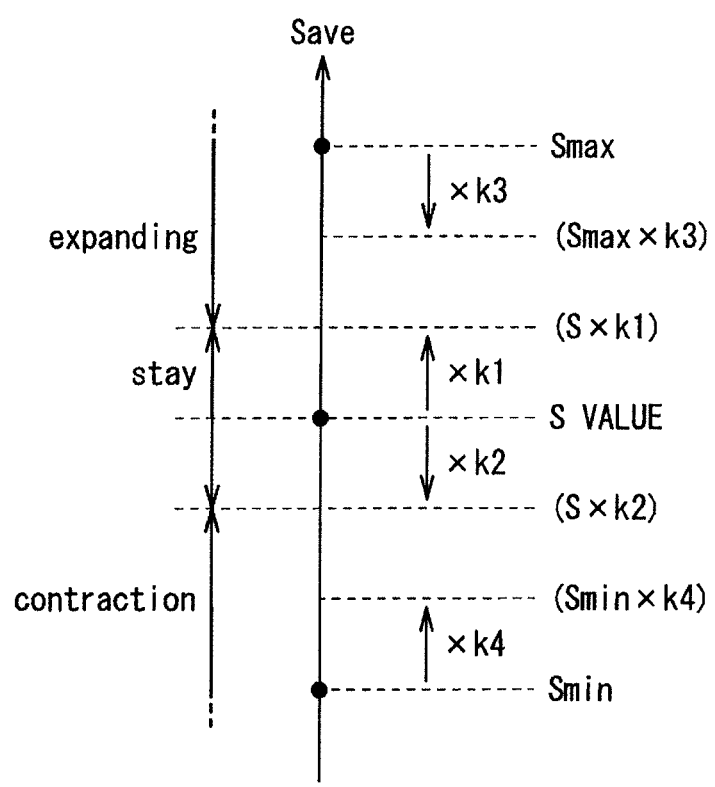
FIG. 7 is a schematic diagram for illustrating a detail of the display-data generation processing shown in FIG. 6.

Next, display-data generation processing by the control section 21 is described in detail with reference to FIGS. 6 and 7. FIGS. 6 and 7 show a detail of the display-data generation processing by the control section 21 in a flowchart and a schematic diagram respectively.

First, the control section 21 acquires area information for several frames from the image processing section 14 (position detection section 47) (step S201 in FIG. 6). Then the control section calculates an average area value Save for several frames based on the area information (step S202).

Next, the control section 21 determines whether a current display mode Status is the stay display mode "stay", the expanding display mode "expanding", or the contraction display mode "contraction" (step S203).

When the current display mode Status is determined to be the stay display mode "stay" in step S203, the control section 21 then determines whether the calculated average area value Save is larger or not than a multiplied value ($S*k1$, upper threshold value) of a current saturated area value (S value) and a predetermined coefficient k1 (larger than 1, for example, 1.1) as shown in FIG. 7 (step S204). When the average area value Save is determined to be larger than $S*k1$ (step S204: Y, Save>$S*k1$), the control section updates the display mode Status to the expanding display mode "expanding", and updates a maximum area value Smax to the current average area value Save (step S205). In such a way, the control section 21 generates display data for the expanding display mode, and the input/output panel 11 performs expanding display (step S206).

On the other hand, when the average area value Save is determined to be equal to or smaller than $S*k1$ in the step S204 (step S204: N, Save≦$S*k1$), the control section 21 then determines whether the average area value Save is smaller or not than a multiplied value ($S*k2$, lower threshold value) of the current saturated area value (S value) and a predetermined coefficient k2 (smaller than 1, for example, 0.9) as shown in FIG. 7 (step S207). When the average area value Save is determined to be smaller than $S*k2$ (step S207: Y, Save<$S*k2$), the control section updates the display mode Status to the contraction display mode "contraction", and updates a minimum area value Smin to the current average area value Save (step S208). In such a way, the control section 21 generates display data for the contraction display mode, and the input/output panel 11 performs contraction display (step S209). On the other hand, when the average area value Save is determined to be equal to or larger than $S*k2$ in the step S207 (step S207: N, Save≧$S*k1$), since the display mode Status is kept to be the stay display mode "stay", the control section generates display data in such a manner that a present state is maintained (no change), and the input/output panel 11 displays the display data (step S210).

In such expanding display or contraction display, an expanding ratio (expanding ratio in expanding a display object) or a contraction ratio (contraction ratio in contracting a display object) may be a fixed value (for example, the expanding ratio is 1.5 and the contraction ratio is 0.5), or a variable value in accordance with a change rate of the average area value Save, respectively. The coefficient k1 defining the upper threshold value and the coefficient k2 defining the lower threshold value may vary in accordance with a sensitivity value of changing display size of the display object. This is because when a value of the coefficient k1 or k2 is set to be closer to 1, the sensitivity becomes higher, and conversely, when the value is set to be more distant from 1, the sensitivity becomes lower.

When the current display mode Status is determined to be the expanding display mode "expanding" in the step S203, the control section 21 then determines whether the average area value Save is larger or not than a current maximum area value Smax (step S211). In the case that the average area value Save is determined to be larger than the current maximum area value Smax (step S211: Y, Save>Smax), the control section keeps the display mode Status to be the expanding display mode "expanding", and updates the maximum area value Smax to the current average area value Save (step S212). In this case, since the current display mode Status is the expanding display mode "expanding", the control section generates display data in such a manner that a present state is maintained (no change), and the input/output panel 11 displays the display data (step S210). That is, the control section 21 generates display data in such a manner that size of a display object is changed in accordance with a change rate of the average area value Save to a saturated area value (S value). In other word, when the current display mode Status is the stay display mode "stay", display data are generated in such a manner that size of a display object is changed only in the case that the display mode Status transitions to the expanding display mode "expanding" or the contraction display mode "contraction" as shown in FIG. 7.

On the other hand, when the average area value Save is determined to be equal to or smaller than the current maximum area value Smax in the step S211 (step S211: N, Save≦Smax), the control section 21 then determines whether the average area value Save is smaller or not than a multiplied value (Smax*k3) of the current maximum area value Smax and a predetermined coefficient k3 (smaller than 1, for example, 0.9) as shown in FIG. 7 (step S213). When the average area value Save is determined to be smaller than Smax*k3 (step S213: Y, Save<Smax*k3), the control section updates the display mode Status to the stay display mode "stay", and updates a saturated area value (S value) to a current average area value Save (step S214). On the other hand, when the average area value Save is determined to be equal to or larger than Smax*k3 (step S213: N, Save≧Smax*k3) in the step S213, the display mode Status is kept to be the expanding display mode "expanding". Since the current display mode Status is kept to be the expanding display mode "expanding" even after processing of the steps S213 and 214, the control section generates display data in such a manner that a present state is maintained (no change), and the input/output panel 11 displays the display data (step S210).

When the current display mode Status is determined to be the contraction display mode "contraction" in the step S203, the control section 21 then determines whether the average area value Save is smaller or not than a current minimum area value Smin (step S215). In the case that the average area value Save is determined to be smaller than the current minimum area value Smin (step S215: Y, Save<Smin), the control section keeps the display mode Status to be the contraction display mode "contraction", and updates the minimum area value Smin to the current average area value Save (step S216).

On the other hand, when the average area value Save is determined to be equal to or larger than the current minimum area value Smin in the step S215 (step S215: N, Save≧Smin), the control section 21 then determines whether the average area value Save is larger or not than a multiplied value (Smin*k4) of the current minimum area value Smin and a predetermined coefficient k4 (larger than 1, for example, 1.1) as shown in FIG. 7 (step S217). When the average area value Save is determined to be larger than Smin*k4 (step S217: Y, Save>Smin*k4), the control section updates the display mode Status to the stay display mode "stay", and updates the saturated area value (S value) to the current average area value Save (step S218). On the other hand, when the average area value Save is determined to be equal to or smaller than Smin*k4 (step S217: N, Save≦Smin*k4) in the step S217, the display mode Status is kept to be the contraction display mode "contraction". Since the current display mode Status is kept to be the contraction display mode "contraction" even after processing of the steps S217 and S218, the control section generates display data in such a manner that a present state is maintained (no change), and the input/output panel 11 displays the display data (step S210).

After processing of each of the steps S206, S209 and S210, whether overall processing is finished is determined (step S219). When processing is determined to be continued (step S219: N), operation is returned to the step S201. When processing is determined to be finished (step S219: Y), overall processing is finished.

In this way, in the display-data generation processing of the embodiment, the light-receiving signal processing section 13 and the image processing section 14 acquire each of position information and area information of an external proximity object based on a light-receiving signal of the object obtained by the input/output panel 11. The control section 21 generates display data in such a manner that size of a display object specified by the external proximity object is changed in accordance with an area value of the object by using the acquired position information and the acquired area information, for example, as shown in the FIGS. 4, 6 and 7. The input/output panel 11 displays an image including the specified display object based on the display data generated in this way.

Figure 8A:
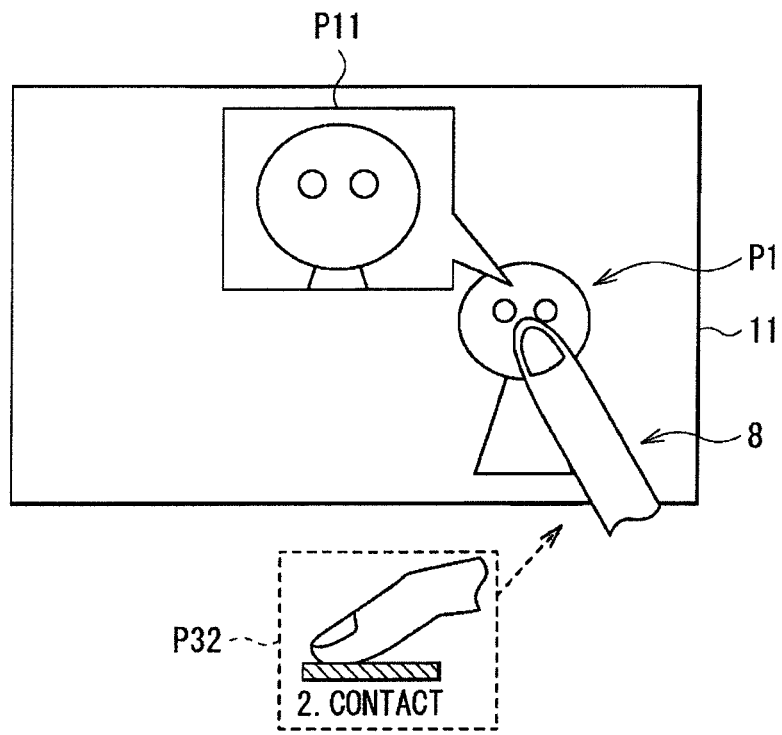
FIGS. 8A, 8B are schematic diagrams showing an example of the information input/output panel applied to an application.
Figure 8B:
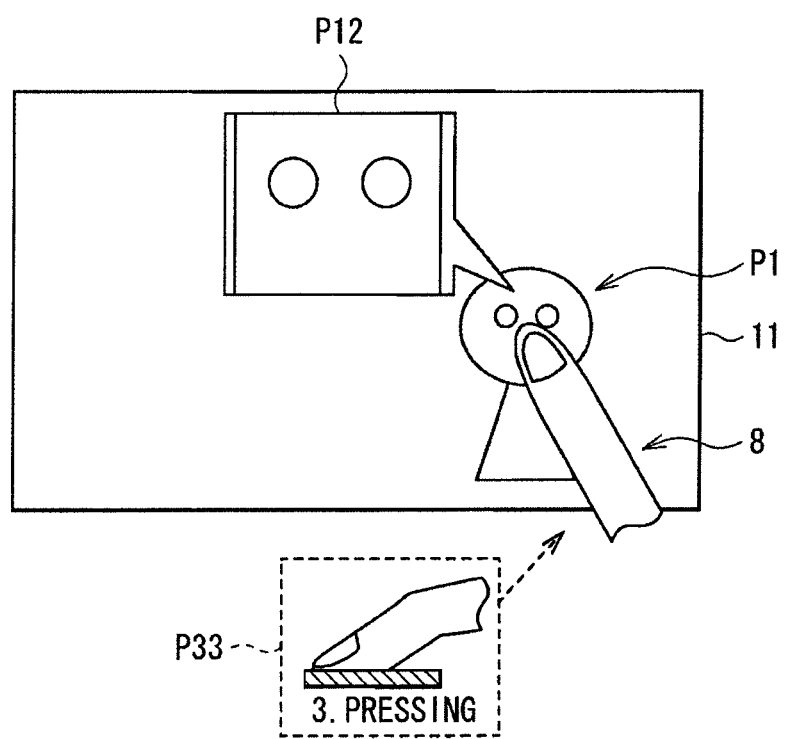
Figure 9A:
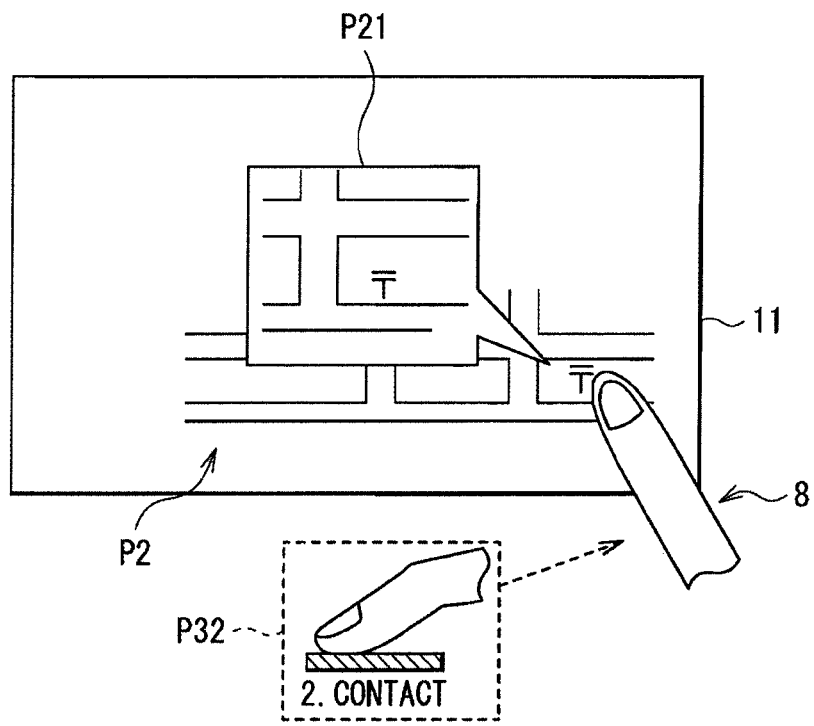
FIGS. 9A, 9B are schematic diagrams showing an example of the information input/output panel applied to another application.
Figure 9B:
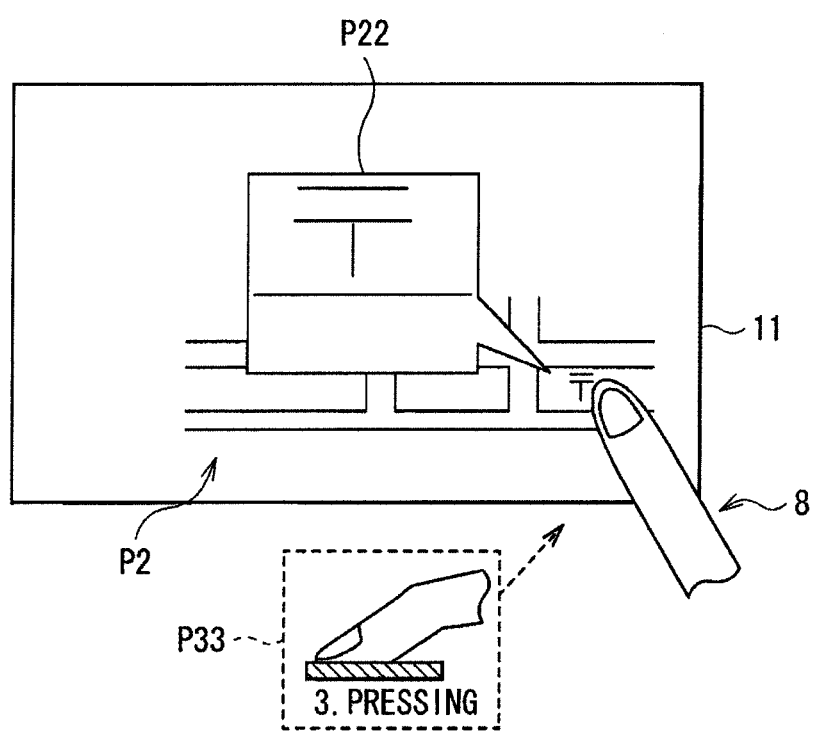

This enables execution of an application where when an external proximity object (finger 8) contacts to a display object P1 displayed on the input/output panel 11 (refer to a sign P32 in the figure), the display object P1 is displayed in an enlarged manner on the input/output panel 11 (refer to a sign P11 in the figure), for example, as shown in FIG. 8A. Furthermore, it enables execution of an application where when the external proximity object (finger 8) is further pressed to the display object P1 displayed on the input/output panel 11 (refer to a sign P33 in the figure), the display object P1 is displayed in a further enlarged manner on the input/output panel 11 (refer to a sign P12 in the figure), for example, as shown in FIG. 8B. On the other hand, it enables execution of an application where when the external proximity object (finger 8) contacts to a display object P2 displayed on the input/output panel 11 (refer to a sign P32 in the figure), the display object P2 is displayed in an enlarged manner on the input/output panel 11 (refer to a sign P21 in the figure), for example, as shown in FIG. 9A. Furthermore, it enables execution of an application where when the external proximity object (finger 8) is further pressed to the display object P2 displayed on the input/output panel 11 (refer to a sign P33 in the figure), the display object P2 is displayed in a further enlarged manner on the input/output panel 11 (refer to a sign P22 in the figure), for example, as shown in FIG. 9B. In this case, as shown in FIGS. 8A, 8B and FIGS. 9A, 9B, the control section 21 preferably generates display data in such a manner that the display object P1 or P2 is displayed in a region separated from a detection position of the external proximity object on the input/output panel 11 by using the position information obtained by the image processing section 14 (position detection section 47). In addition to the application shown in FIGS. 8A to 9B, the image processing may be applied to an application where sound volume, image luminance (tone), contrast, or hue balance of a display object is changed, or an application where numerical value (parameter) input is performed.

As hereinbefore, in the embodiment, the light-receiving signal processing section 13 and the image processing section 14 acquire each of position information and area information of an external proximity object based on a light-receiving signal of the object obtained by the input/output panel 11, and the control section 21 generates display data in such a manner that size of a display object specified by the external proximity object is changed in accordance with an area value of the object by using the acquired position information and the acquired area information. Therefore, when information on the external proximity object is inputted, highly-convenient information input may be performed with a simple structure.

When the coefficient k1 defining the upper threshold value and the coefficient k2 defining the lower threshold value are changed in accordance with a sensitivity value of changing display size of the display object, further highly-convenient information input may be performed.

When the control section 21 generates display data in such a manner that a display object is displayed in a region separated from a detection position of an external proximity object on the input/output panel 11 by using the position information obtained by the image processing section 14 (position detection section 47), highly-convenient information input (image display) may be performed.

Hereinbefore, the invention has been described with the embodiment. However, the invention is not limited to the embodiment, and may be variously altered or modified.

For example, in the processing of generating display data by the control section 21 as shown in FIGS. 6 and 7, whether a display mode transitions to the stay display mode "stay" or the contraction display mode "contraction" may be selected in accordance with size of a current average area value Save between the steps S213 and S214. Similarly, whether a display mode transitions to the stay display mode "stay" or the expanding display mode "expanding" may be selected in accordance with size of a current average area value Save between the steps S213 and S214.

While description has been made on a case where the control section 21 uses, as an area value, an average value (average area value Smax) of a plurality of detected value of area acquired along time base in the embodiment, the control section 21 may directly use an area value in each frame.

Figure 10:
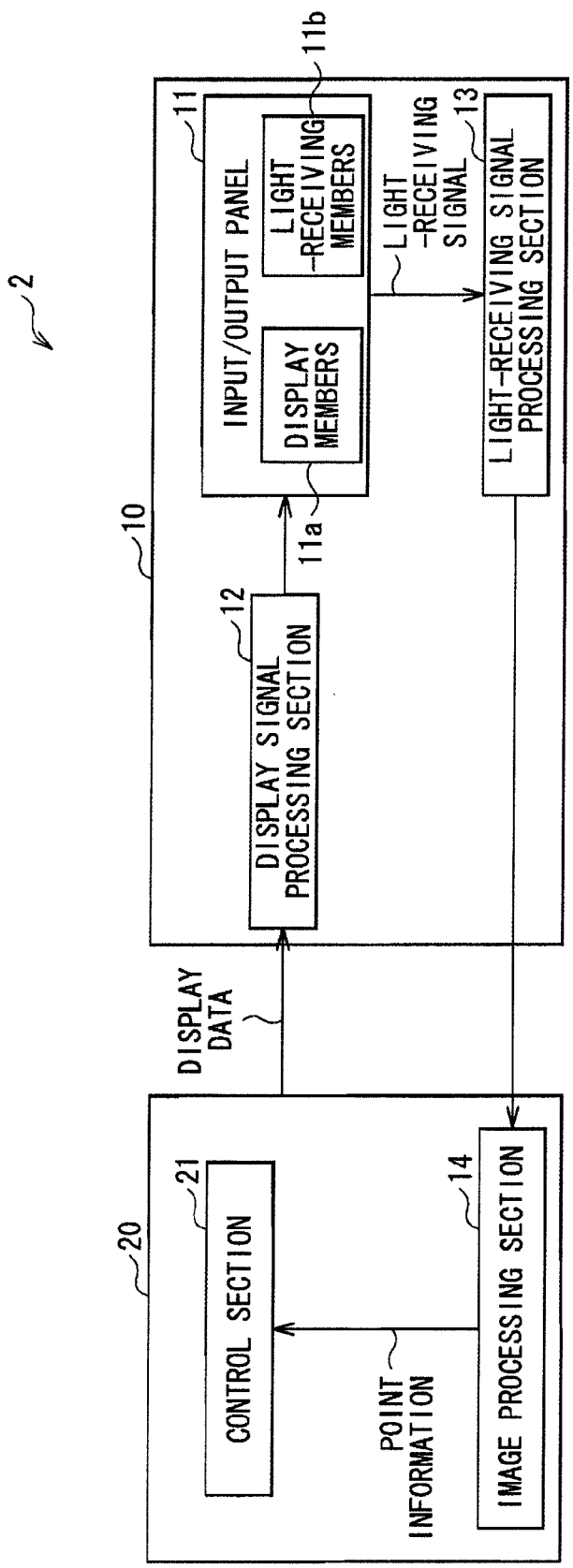
FIG. 10 is a block diagram showing a configuration of an information input/output device according to a modification of the invention.

The information input/output device of the invention is not limited to the information input/output device 1 described in the embodiment, and for example, the invention may be applied to an information input/output device 2 as shown in FIG. 10. The information input/output device 2 is different from the information input/output device 1 according to the embodiment in that the image processing section 14 is provided in the electronic device body 20. That is, the information input/output device 2 is made in such a manner that the display signal processing section 12, the input/output panel 11, and the light-receiving signal processing section 13 are provided in the display 10, and the control section 21 and the image processing section 14 are provided in the electronic device body 20. Even in such an information input/output device 2, the same advantages as in the information input/output device 1 according to the embodiment may be exhibited.

While a case where the control section 21 is provided in the electronic device body 20 has been described hereinbefore, the control section 21 may be provided in the display 10.

In the example shown in FIGS. 1 and 2, one light-receiving cell is provided in correspondence to one light-emitting cell. However, one light-receiving cell may be provided in correspondence to a plurality of light-emitting cells.

The information input/output device 1 or 2 described in the embodiment has a configuration where a liquid crystal display panel is used as the input/output panel 11. However, the information input/output device of the invention may have a configuration where an organic electroluminescence (EL) panel or the like is used as the input/output panel. The organic EL element has a property that when the EL element is applied with a forward bias voltage, it performs light emission operation, and when the EL element is applied with a reverse bias voltage, it receives light and generates a current. Therefore, the organic EL element has a display member 11a and a light-receiving member 11b. An input/output panel 11 is configured by disposing organic EL elements for each pixel 16, and when some organic EL elements are applied with a forward bias voltage in accordance with display data to perform light emission operation, an image is displayed while other organic EL elements are applied with a reverse bias voltage so as to receive reflected light.

In the embodiment, the invention has been described exemplifying the information input/output device 1 including the input/output panel 11 having a plurality of display members 11a and a plurality of light-receiving members 11b (having a detection function of detecting an external proximity object and an image display function). However, the invention may be applied to an information input device (image pickup device) including an input panel having a plurality of light-receiving members 11b (having a detection function of detecting an external proximity object). That is, such an input panel, and an output panel (display panel) performing image display based on display data generated by the control section 21 may be separately provided.

Figure 11:
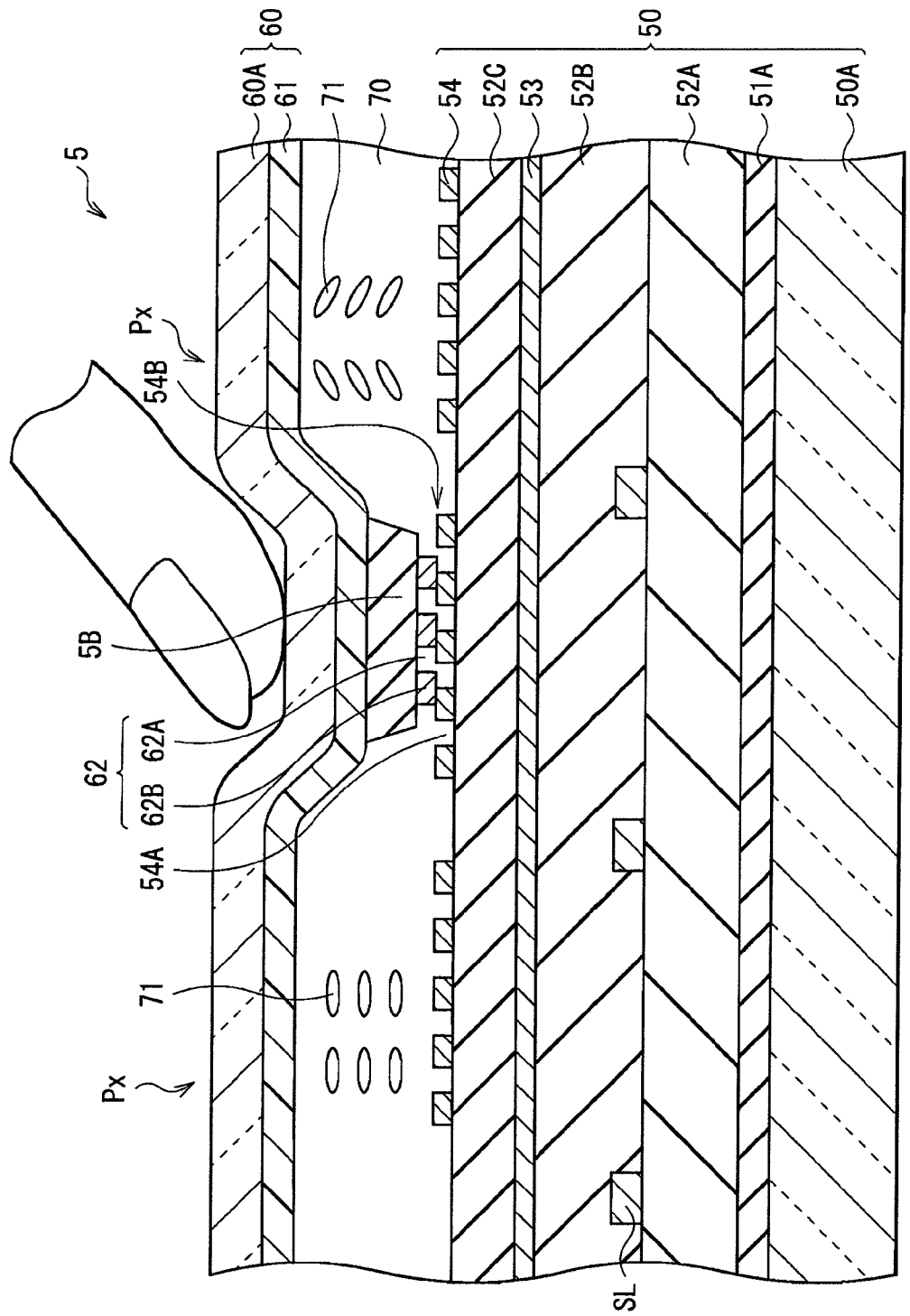
FIG. 11 is a section diagram showing a configuration of an input/output panel according to the modification of the invention.

Hereinbefore, the invention has been described exemplifying the information input/output device 1 or 2 provided with the input/output panel 11 (including an optical touch sensor) having a plurality of display members 11a and a plurality of light-receiving members 11b. However, the invention may be applied to an information input/output device provided with an input/output panel 5 shown in FIG. 11 (an input/output panel including a resistive touch sensor having a section structure of a pixel Px). The input/output panel 5 includes a first substrate 50 having a glass substrate 50A, a gate insulating film 51A, a first interlayer insulating film 12A, signal lines SL, a second interlayer insulating film 52B, a common electrode 53, a third interlayer insulating film 52C, and pixel electrodes 54 (first sensor electrodes); a second substrate 60 having a glass substrate 60A, a color filter 61 and counter sensor electrodes 62 (second sensor electrodes); and a liquid crystal layer 70 including liquid crystal molecules 71. That is, the pixel electrodes 54 and the counter sensor electrodes 62 configure a resistive touch sensor within the input/output panel 5. Each of the pixel electrodes 54, for example, has a section shape including a plurality of edges 54B. An orientation film (not shown) tends to be thinned on each edge 54B, and therefore the edge 54B is exposed from the orientation film. A counter sensor electrode 62 (including slits 62A and patterns 62B) is disposed opposite the edges 54B. Thus, when the second substrate 60 is deflected, the counter sensor electrode 62 contacts to exposed edges 54B of the pixel electrode 54, and thereby direct conduction may be made between the electrodes 62 and 54, suppressing instability of position detection. Particularly, in the case that the input/output panel 5 is an FFS (Fringe Field Switching) liquid crystal display panel, since the pixel electrode 54 originally has a planar shape including a plurality of slits 54A, position detection performance may be improved without reducing an open area ratio.

A series of processing described in the embodiment may be carried out by hardware or software. When the series of processing is carried out by software, a program configuring the software is installed into a general purpose computer or the like. Such a program may be beforehand stored in a recording medium built in a computer.

Furthermore, the information input/output device and the like described hereinbefore may be used for an electronic device in any field where an externally inputted video signal or an internally generated video signal is displayed in a form of a still image or a video image, the electronic device including a TV apparatus, a digital camera, a notebook computer, a mobile terminal such as mobile phone, or a video camera.

The present application contains subject matter related to that disclosed in Japanese Priority Patent Application JP 2008-225122 filed in the Japan Patent Office on Sep. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information input device, comprising:
   an input panel having a detection function of detecting an external proximity object;
   a position detection section detecting position and area value of the external proximity object based on a detection signal of the external proximity object obtained by the input panel; and
   an image generation section generating display data to be utilized to display an image including a display object, in such a manner that size of the display object displayed on the display panel at the detected position of the external proximity object is allowed to vary in accordance with the detected area value of the external proximity object, and further wherein the detected area value corresponds to a single contact portion for the display and the size of the displayed object is adjusted based on the area value for this single contact portion.

2. The information input device according to claim 1, wherein
   the image generation section holds a saturated area value which is an area value under condition that time variation of the area value is maintained within a predetermined range, and
      the image generation section generates display data in such a manner that size of the display object is allowed to vary in accordance with a change rate of the area value to the saturated area value.

3. The information input device according to claim 2, wherein the image generation section generates the display data in such a manner that:
   when the change rate of the area value is larger than a predetermined upper threshold value, size of the display object is allowed to be expanded;
   when the change rate of the area value is smaller than a predetermined lower threshold value, size of the display object is allowed to be contracted; and
   when the change rate of the area value falls in a range from the lower threshold value to the upper threshold value, size of the display object is maintained as it is.

4. The information input device according to claim 3, wherein an expanding ratio and a contraction ratio are fixed, the expanding ratio and the contraction ratio being used when the image generation section expands and contracts the display object, respectively.

5. The information input device according to claim 3, wherein an expanding ratio and a contraction ratio are variable, the expanding ratio and the contraction ratio being used when the image generation section expands and contracts the display object, respectively.

6. The information input device according to claim 3, wherein each of the upper threshold value and the lower threshold value is changed in accordance with a sensitivity value of changing display size of the display object.

7. The information input device according to claim 1, wherein the image generation section generates the display data in such a manner that the display object is allowed to be displayed in a region at a distance from the detected position of the external proximity object.

8. The information input device according to claim 1, wherein the image generation section employs, as the area value, an average value of a plurality of detected value of area acquired along time base.

9. The information input device according to claim 1, wherein the input panel has a plurality of light-receiving elements arranged along an image-pickup area to receive light reflected from the external proximity object.

10. The information input device according to claim 1, wherein the input/output panel has:
   a first substrate and a second substrate facing each other; and
   a first sensor electrode and a second sensor electrode, both formed between the first substrate and the second substrate, to be allowed to contact to each other when the second substrate is dented by touch pressure, and
   the input/output panel detects a dent position of the second substrate in accordance with a contact position of the external proximity object based on change in electrical potential due to contact of the first sensor electrode with the second sensor electrode.

11. An information input method comprising steps of:
   detecting position and area value of an external proximity object based on a detection signal of the external proximity object obtained by an input panel placed on a display panel; and
   generating display data to be utilized to display an image including a display object, in such a manner that size of the display object displayed on the display panel at the detected position of the external proximity object is allowed to vary in accordance with the detected area value of the external proximity object, and further wherein the detected area value corresponds to a single contact portion for the display and the size of the displayed object is adjusted based on the area value for this single contact portion.

12. An information input/output device, comprising:
   an input/output panel having a detection function of detecting an external proximity object and an image display function;

a position detection section detecting position and area value of the external proximity object based on a detection signal of the external proximity object obtained by the input/output panel; and an image generation section generating display data to be utilized to display an image including a display object, in such a manner that size of the display object displayed on the input/output panel at the detected position of the external proximity object is allowed to vary in accordance with the detected area value of the external proximity object, wherein the image including the display object is displayed on the input/output panel based on the display data, and further wherein the detected area value corresponds to a single contact portion for the display and the size of the displayed object is adjusted based on the area value for this single contact portion.

13. The information input/output device according to claim 12, wherein the input/output panel has:
a plurality of display elements arranged along a display screen to display an image based on image data; and
a plurality of light-receiving elements arranged along the display screen to receive light emitted from the display screen and reflected from the external proximity object.

14. The information input/output device according to claim 12, wherein the input/output panel has:
a display panel having a first substrate and a second substrate, and having a liquid crystal layer provided between the first substrate and the second substrate; and
a first sensor electrode and a second sensor electrode, both formed in the display panel, to be allowed to contact to each other when the second substrate is dented by touch pressure, and
the input/output panel detects a dent position of the second substrate in accordance with a contact position of the external proximity object based on change in electric potential due to contact of the first sensor electrode with the second sensor electrode, and performs image display on the display panel.

15. An information input program:
wherein the program is stored in an electronic memory and when the machine instructions are executed by one or more processors the system executing the instructions performs:
detecting position and area value of an external proximity object based on a detection signal of the external proximity object obtained by an input panel placed on a display panel; and
generating display data utilized to display an image including a display object in such a manner that size of the display object displayed on the display panel at the detected position of the external proximity object is allowed to vary in accordance with the detected area value of the external proximity object, and further wherein the detected area value corresponds to a single contact portion for the display and the size of the displayed object is adjusted based on the area value for this single contact portion.

* * * * *